United States Patent [19]

Shigeta et al.

[11] 4,156,912
[45] May 29, 1979

[54] ELECTRONIC NAVIGATION CALCULATOR

[75] Inventors: Tomogoro Shigeta, Tokyo; Masuo Okuda, Ohsaka; Tetsuo Ohnishi, Mie, all of Japan

[73] Assignee: Systek Corporation, Tokyo, Japan

[21] Appl. No.: 523,903

[22] Filed: Nov. 14, 1974

[30] Foreign Application Priority Data

Jul. 31, 1974 [JP] Japan .................................. 49-87624

[51] Int. Cl.² ........................ G06F 15/50; G06F 9/18
[52] U.S. Cl. .................................... 364/443; 364/709; 364/715
[58] Field of Search ...................... 235/152, 156, 150.2, 235/150.26; 364/443, 709, 715

[56] References Cited

U.S. PATENT DOCUMENTS

| 3,758,765 | 9/1973 | Vietor | 235/150.26 |
| 3,760,171 | 9/1973 | Wang et al. | 235/156 |
| 3,786,505 | 1/1974 | Rennie | 235/150.26 X |
| 3,816,731 | 6/1974 | Jennings et al. | 235/156 |
| 3,821,523 | 6/1974 | Chisholm et al. | 235/150.2 X |
| 3,855,459 | 12/1974 | Hakata | 235/156 X |
| 3,924,111 | 12/1975 | Farris | 235/156 |

Primary Examiner—Jerry Smith
Attorney, Agent, or Firm—Hill, Gross, Simpson, Van Santen, Steadman, Chiara & Simpson

[57] ABSTRACT

An electronic navigation calculator having first input key group for navigation functions, second input key group for navigation numerals, third input key group for navigation operations, a memory device supplied with information signals from said first, second and third input key groups and memorizing said supplied information signals, operational and control device for carrying out predetermined navigation calculations in accordance with information signals from said input key groups, and output device for indicating the calculated results. As a result, a calculation of direction, speed, position and time of a moving body is carried out in accordance with said information signals from said first, second and third input key groups and the calculation result is displayed.

4 Claims, 5 Drawing Figures

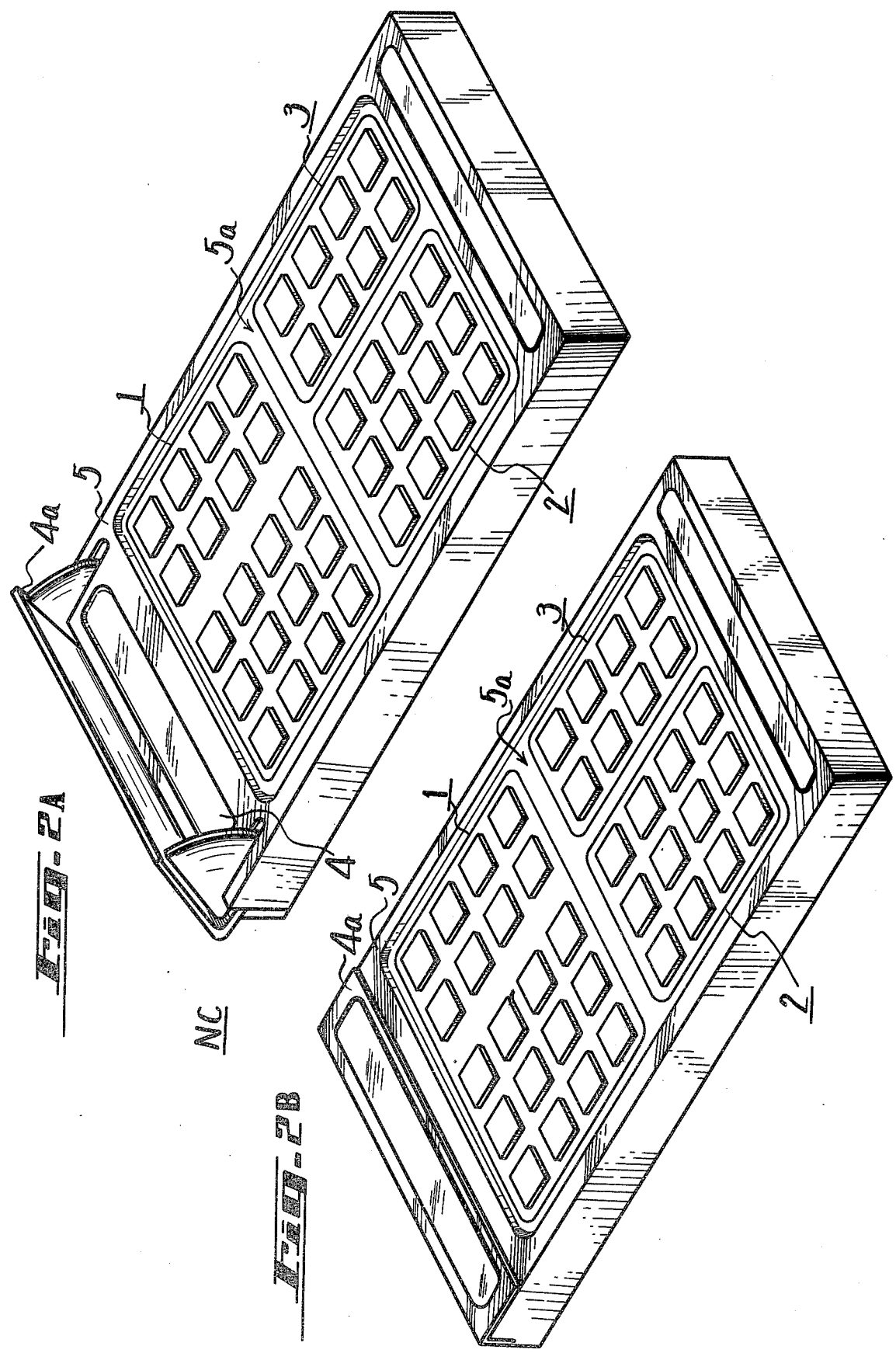

ELECTRONIC NAVIGATION CALCULATOR

BACKGROUND OF THE INVENTION

Field of the Invention

This invention relates generally to an electronic navigation calculator, and more particularly to an electronic navigation calculator for making navigation calculations for a moving vehicle such as an airplane which moves with direction and velocity when the airplane is in flight. The invention considers the effects of wind.

Description of the Prior Art

In general, the course made good, the speed and position of a moving vehicle in a moving medium are calculated based upon the speed and heading of the moving vehicle and the direction and velocity of the medium through which the vehicle travels. For example, the ground speed and course of an airplane, which makes a flight in moving air (wind), can be calculated based upon a composite vector of the wind vector and the airplane's airspeed and heading.

A navigation calculation for an airplane flight plan will be now described with reference to FIG. 1 as an example. In FIG. 1, reference letters WD and WS indicate direction and speed of the wind, respectively, TAS the true air speed of an airplane which must fly in the wind, TC the true course of the airplane on an air map or sectional chart, WCA the wind correction angle for the airplane flying on the true course TC, TH the airplane's true heading and GS the ground speed of the airplane, which are calculated by the following equations solving a wind triangle.

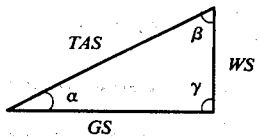

$\alpha = TH - TC(=WCA)$
$\beta = WD - TH$
$\gamma = \pi + TC - WD$
$WS \sin \alpha = TAS \sin \gamma$
$GS^2 = TAS^2 + WS^2 - 2TAS \cdot WS \cos \beta$ $$WCA = \sin^{-1}\left\{\frac{WS}{TAS} \sin(\pi + TC - WD)\right\}$$

$$TH = TC + \sin^{-1}\left\{\frac{WS}{TAS} \sin(\pi + TC - WD)\right\}$$

$$GS = \{TAS^2 + WS^2 + 2\, TAS \cdot WS \cos(WD - TH)\}^{\frac{1}{2}}$$

The above equations are fundamental equations for aircraft navigation. However, in a practical aircraft navigation calculation, complicated calculations such as, for example, conversion of an instrument air speed (IAS) to the true air speed (TAS) correction for magnetic variation, correction for compass deviation correction for speed error, calculation of estimated time enroute, calculation of fuel consumption, fuel on board and time and so on must be carried out.

In order to carry out the above complicated calculations, in the art a dead reckoning slide rule has been known. However, such prior art dead reckoning slide rule requires a great deal of skill for use because it is complicated. Further, such slide rule cannot be operated with one hand, so the a pilot can not perform a navigation calculation with the prior art slide rule while he pilots the airplane and hence the prior art slide rule is limited in use.

In order to ensure a safe flight of an airplane, it is required to prepare an accurate flight plan and to correct the same in accordance with changes during flight. However, in fact if a navigation calculation is complicated and a calculator therefor is difficult to operate such as the prior art slide rule, a navigator or pilot is apt to carry out the navigation calculation incorrectly, which can result in danger.

In addition, the prior art slide rule can not accurately make navigation calculations.

SUMMARY OF THE INVENTION

It is an object of this invention to provide a novel electronic navigation calculator.

It is another object of the invention to provide an electronic navigation calculator which is easy to handle and to correct calculations.

It is a further object of the invention to provide an electronic navigation calculator which can calculate a flight plan and modifications and contributes to improve the safety of the flight and reduce fuel consumption of an airplane.

The other objects, features and advantages of the invention will become apparent from the following description taken in conjunction with the accompanying drawing.

BRIEF DESCRIPTION OF THE DRAWING

FIGS. 2A and 2B are perspective views showing an embodiment of the electronic navigation calculator according to the invention;

DESCRIPTION OF THE PREFERRED EMBODIMENT

An embodiment of the electronic navigation calculator according to the invention will be hereinafter described with reference to FIGS. 2 to 4.

Figure 3:
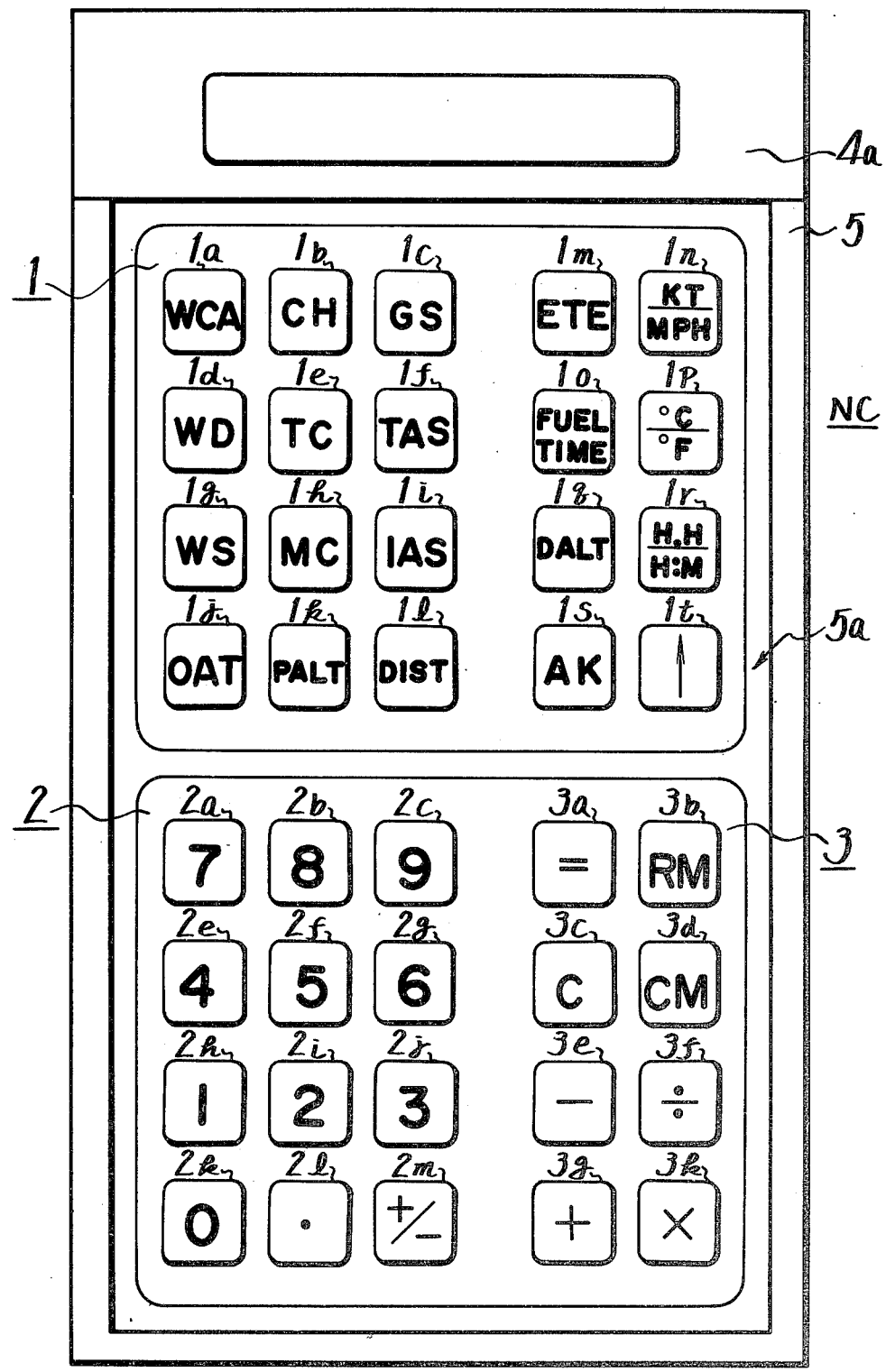
FIG. 3 is a top plan view of the electronic navigation calculator shown in FIGS. 2A and 2B.

FIGS. 2A and 2B show an embodiment of the electronic navigation calculator according to the present invention in perspective view FIG. 3 shows its top front. In the figures, reference letter NC generally designates the electronic navigation calculator which is housed in a case 5 and is provided with a function key or push-button switch group 1, numeral input key or push-button switch group 2 and an operational function key or push-button switch group 3. The key groups 1, 2 and 3 are protruded through a top panel 5a of the case 5. As shown in the figures, especially in FIG. 3, the navigation function key group 1 include a plurality of keys or switches 1a to 1t each of which has inscribed on its top or key board near the same a term, symbol or abbreviated word for the navigation calculation. That is, the key 1a is for wind correction angle (WCA); the key 1b for compass heading (CH); the key 1c for ground speed (GS); the key 1d for wind direction (WD); the key 1e for true course (TC); the key 1f for true air speed (TAS); the key 1g for wind speed (WS); the key 1h for magnetic course (MC); the key 1i for indicated air speed (IAS); the key 1j for outside air temperature (OAT); the key 1k for pressure altitude (PALT); the key 1l for flight distance (DIST); the key 1m for estimate time enroute (ETE); the key 1n for nautical mile-statute mile conversion (kt/MPH); the key 1o for fuel on board time $$\left(\frac{FUEL}{TIME}\right);$$

the key 1p for temperature conversion (°C./°F.); the key 1q for density altitude (DALT); the key 1r for hour-hour and minute conversion (H.H/H:M); the key 1s for accessing a memory device (described later) in combination with numerical input (AK); and the key 1t for supply of an input to the accessed memory device (↑), respectively.

The numerical input key or switch group 2 include a plurality of keys or switches 2a to 2m which correspond to numerals 0 to 9, decimal point and sign change (+/−), as shown.

The operational function key or switch group 3 include a plurality of keys or switches 3a to 3h correspond to functions inscribed with abbreviated words on the keys 3a to 3h.

In FIG. 2B, reference numeral 4 designates a display device such as a digitron display tube, a Nixie display tube, a light emission diode display tube, a plasma display tube, a liquid crystal display tube or the like which displays the informations supplied by the numerical input key group 2, the information read out from the memory device and, the result of the navigation calculation, respectively. The display device 4 is closed by a hood 4a when the electronic navigation calculator NC is not used, by way of example, as shown in FIG. 2A and FIG. 3. If desired, it is possible to employ an electric typewriter a digital printer, a thermal printer or the like which is supplied with the signals corresponding to the above informations and records the same.

Figure 1:
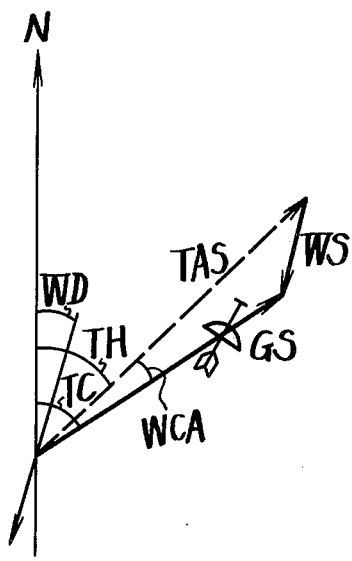
FIG. 1 is a graph used for explaining the theory of aircraft navigation calculations.
Figure 4:
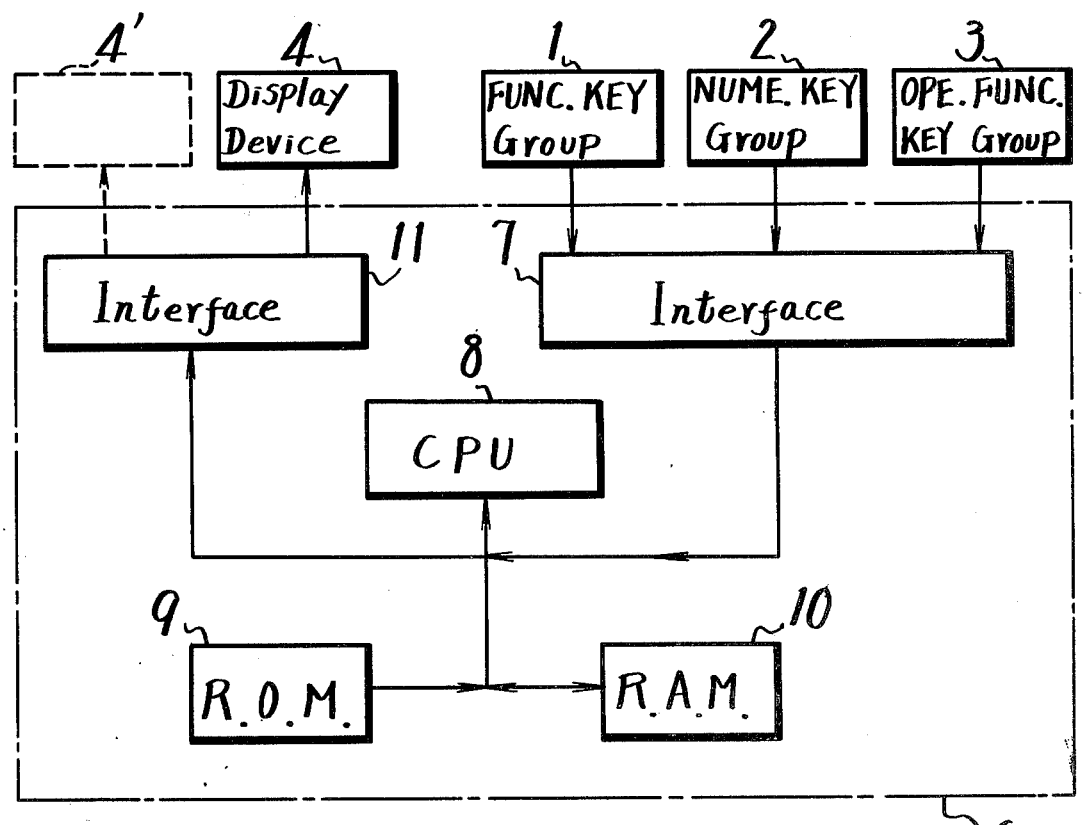
FIG. 4 is a block diagram showing the main circuit elements used in the electronic navigation calculator of the invention.

With reference to FIG. 4, an example of the memory-operation control circuit 6, which may memorize the informations supplied from the function key group 1 and the numerical input key group 2 and carry out a predetermined navigation calculation based upon the informations from the operational function key group 3 and so on and which is housed in the case 5, will be now described.

In FIG. 4, reference numeral 7 indicates an input interface which is supplied with input signals for operation from the key groups 1, 2 and 3, respectively. The output signal of the interface 7 is applied to a central processing unit 8 which achieves a calculation therefor. The central processing unit 8 is also supplied with a program signal from a read only memory 9. A random access memory 10 is supplied with the output of the central processing unit 8 to store the same and applies the stored data signal to the central processing unit 8. An output interface 11 is supplied with the output signal of the central processing unit 8 and applies the same to the display device 4 to be displayed.

The above construction is a so-called micro-computer which consists of the central processing unit 8, read only memory 9, random access memory 10, input interface 7 and output interface 11. The micro-computer is controlled with the program written in the read only memory 9. However, in place of the micro-computer, well known discrete parts can be used or an LSI (large scale integration) used for operational control of an electronic type calculator can be utilized. In other words, it should be noted that the above construction is merely an embodiment.

Further, it may be also possible that the output signal from the output interface 11 is applied to an electric typewriter, printer or the like (which is shown in FIG. 4 by a dotted line block 4) to indicate and/or record the calculated results.

An example of the operational sequence of the electronic navigation calculator NC according to the invention will be now described.

Calculation Example

With wind direction 30°; wind speed 25 knots; true air speed 100 mile/hour; course 60°; magnetic variation west 6°; and a distance 95 miles, a wind angle, a true heading, a ground speed and an estimate time enroute of an airplane necessary for its flight plan are obtained by operating the navigation function key group 1 and the numerical input key group 2 as follows and in the indicated sequence.

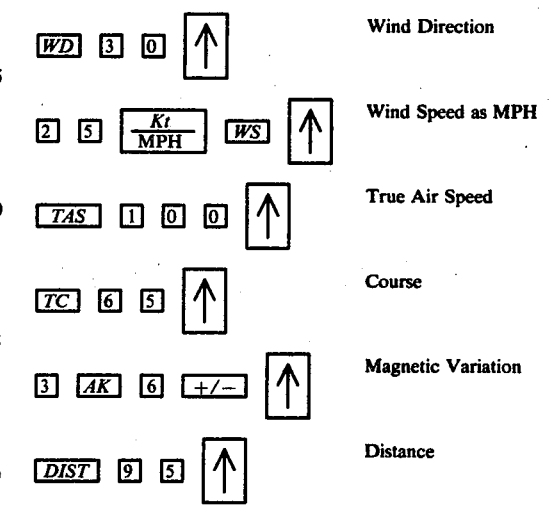

As seen from the above, in the case of calculating the wind speed, the unit knot is converted to the unit mile/-hour by the key 1n, and in the case of calculating the magnetic variation, the memory for the magnetic variation is pointed out by the keys 2j and 1s and then applied as an input signal.

Based upon the above input signals, the calculation required for the flight plan on the airplane is carried out by the following output operation and the calculated result is shown on the display device 4.

| | | | |
|---|---|---|---|
| Correction Angle | [WCA] | [=] → | [10.0] |
| True Heading of Airplane | [CH] | [=] → | [61.0] |
| Ground Speed | [GS] | [=] → | [75.0] |
| Estimate Time Enroute | [ETE] | [=] → | [1.27] |
| | [H·H / H:M] | | [1.16] |

As a result, if the airplane flies in the direction of a compass direction 61°, it will arrive at the destination after 1 hour and 16 minutes at the ground speed of 75 mile/hour.

The above operation will be now described in detail.

When a power source switch (not shown) of the electronic navigation calculator NC is turned ON, all the memories are cleared by the program control of the read only memory 9 and then the navigation calculator NC is placed in stand-by condition. Thereafter, when the key 1d is pushed down, the function corresponding to the key 1d is appointed by the programme control. Then, the keys 2j and 2k are pushed to set the value 30, and the key 1t is pushed to drive the memory storing program, and hence the input information 30 is stored in an appropriate wind direction memory of the random access memory 10. Similarly, the input information of the wind speed, true air speed, course, magnetic variation and distance are stored in the random access memory 10.

After all the necessary informations are stored in the random access memory 10, the navigation calculation is carried out in accordance with the stored informations as follows. That is, the key 1a is pushed to command the function, and then the key 3a is pushed to initiate the correction angle calculation program stored in the read only memory 9. Then, the computer 8 makes the calculation for the correction angle and applies the calculated signal to the display device 4 for display. The keys 1c and 3a are depressed sequence to command the ground speed calculation program, and the ground speed is calculated by the central processing unit 8 which applies its calculated result to the display device 4 to be displayed. At the same time, the calculated signal is applied to the selected ground speed memory of the random access memory 10 to be stored.

In the case where the estimate time enroute is calculated, the keys 1m and 3a are operated to initiate the estimated time enroute calculation program and then the central processing unit 8 makes the time enroute. The calculated signal is applied to the display device 4 to be displayed. This time is converted to hours and minutes by operating the key 1p based upon the hour and minute conversion program and is then displayed.

An example of the navigation calculation treatment for a flight by the electronic navigation calculator of the invention will be now described.

(1) Flight Plan Calculation
  Calculation for wind correction angle
  Calculation for compass heading
  Calculation for ground speed
  Calculation for estimate time enroute
  Calculation for fuel on board time
(2) Wind Force Calculation
  Calculation for wind direction
  Calculation for wind speed
(3) Conversion Calculation
  Knot↔mile/hour
  °C.↔°F.
  Hour⇌Hour and Minute
  Instrument air speed↔True air speed
  True course↔Magnetic course
  Pressure altitude↔Density altitude
(4) Calibration
  Calibration for speed meter error correction
  Calibration for compass deviation correction With the electronic navigation calculator according to the invention, the various navigation calculations are achieved only by operating or pushing the keys, so that a pilot of, for example, an airplane can carry out the various navigation calculations before the flight and/or during the flight. Further, these calculations are carried out rapidly, accurately and easily, so that the airplane can estimate its flight safely and economically. The fact that the esitmate time enroute can be obtained easily and correctly is useful not only to the pilot but also to the ground station personnel.

The above description is given for the case where the electronic navigation calculator of the invention is used to make navigation calculations for air flight only, but it will be apparent that the electronic navigation calculator of the invention can be used for navigation of other craft and for calculating the position, speed, direction, time and so on of vehicles moving in changing circumstances.

It may be apparent that many modifications and variations could be effected by one skilled in the art without departing from the spirit and scope of the novel concepts of the invention.

We claim as our invention:

1. An electronic hand-held pocket-sized portable calculator for aiding the solution of navigational-type problems encountered in the navigation of airborne equipment, said calculator comprising:
  a. first manually operable input means having a plurality of manually operable data input elements for introducing navigational-type data,
  b. second manually operable input means for introducing a first instructional command to enable a computation based on any of time, speed or distance functions based on said introduced navigational-type data,
  c. Third manually operable input means for introducing a second instructional command to enable a ground speed, air speed or wind vector function computation based on said introduced navigational-type data,
  d. a fourth manually operable input means for introducing a third instructional command to enable a conversion function computation based on said introduced navigational-type data,
  e. first programmed memory means operatively connected to said first, second, third and fourth input means to receive navigational-type data and said instructional commands,
  f. arithmetic control means operatively connected to said first memory means to perform mathematical computations on the data pursuant to the instructional commands,
  g. second programmed memory means operatively connected to said arithmetic control means and input means, and
  h. display means operatively connected to said second memory means for displaying computational results of the mathematical computations on the navigational-type data to provide a navigational-type solution based on the data input and the introduced instructional commands.

2. An electronic hand-held pocket-sized portable calculator for aiding the solution of navigational-type problems encountered in the navigation of airborne equipment, said calculator comprising:
  a. first manually operable input means for introducing navigational-type data relating to any of time, speed, wind, and distance of airborne equipment,
  b. first storage means operatively connected to said first input means to receive said data,
  c. second manually operable input means for introducing a first instructional command to enable a computation based on time, speed or distance functions based on said introduced navigational-type data,
d. third manually operable input means for introducing a second instructional command to enable a ground speed, air speed or wind vector function computation based on said introduced navigational-type data,
e. a fourth manually operable input means for introducing a third instructional command to enable a conversion function computation of temperature from one scale to a second scale based on said navigational-type data,
f. second storage means including a computing means operatively connected to said first, second, third and fourth input means and said first storage means to perform the selected computation on said introduced data based on the introduced instructional command,
g. and display means operatively connected to said second memory means for displaying computational results of the mathematical computations on the data.

3. The electronic calculator of claim 2 further characterized in that the time, speed or distance computation is a function of the input of the navigational-type data relating to two of the time, speed or distance functions so that a third of the function is calculated thereby.

4. The electronic calculator of claim 3 further characterized in that the ground speed, wind or air speed computation is a function of the input of the navigational-type data relating to two of the ground speed, wind vector or air speed functions so that a third of the functions is calculated thereby.

* * * * *